United States Patent
Gu et al.

(10) Patent No.: US 7,822,039 B2
(45) Date of Patent: Oct. 26, 2010

(54) LOOK-UP TABLE BASED APPROACH FOR LAYER COMBINING IN ISDB-T AND ISDB-TSB RECEIVERS

(75) Inventors: Yongru Gu, Lake Forest, CA (US); Jun Ma, Xian (CN)

(73) Assignee: Newport Media, Inc., Lake Forest, CA (US)

( * ) Notice: Subject to any disclaimer, the term of this patent is extended or adjusted under 35 U.S.C. 154(b) by 267 days.

(21) Appl. No.: 12/107,963

(22) Filed: Apr. 23, 2008

(65) Prior Publication Data

US 2009/0268735 A1    Oct. 29, 2009

(51) Int. Cl.
*H04L 12/28* (2006.01)
(52) U.S. Cl. .................................. 370/392; 725/75
(58) Field of Classification Search .......... 370/208, 370/203, 235, 538, 395, 389
See application file for complete search history.

(56) References Cited

U.S. PATENT DOCUMENTS

| | | | |
|---|---|---|---|
| 6,185,635 B1 * | 2/2001 | O'Loughlin et al. | 710/31 |
| 6,727,847 B2 * | 4/2004 | Rabinowitz et al. | 342/357.06 |
| 7,327,669 B2 * | 2/2008 | Miyato et al. | 370/208 |
| 7,492,714 B1 * | 2/2009 | Liao et al. | 370/235 |
| 7,626,960 B2 * | 12/2009 | Muller | 370/328 |
| 2004/0181800 A1 * | 9/2004 | Rakib et al. | 725/25 |
| 2005/0068992 A1 * | 3/2005 | Kaku et al. | 370/535 |
| 2006/0092867 A1 * | 5/2006 | Muller et al. | 370/312 |
| 2007/0053370 A1 * | 3/2007 | Aghvami et al. | 370/401 |
| 2007/0072543 A1 * | 3/2007 | Paila et al. | 455/3.06 |
| 2007/0177492 A1 * | 8/2007 | Walker | 370/203 |
| 2007/0247936 A1 * | 10/2007 | Direnzo et al. | 365/200 |
| 2008/0240679 A1 * | 10/2008 | Shibutani et al. | 386/95 |
| 2008/0250463 A1 * | 10/2008 | Shibusawa et al. | 725/75 |
| 2009/0013356 A1 * | 1/2009 | Doerr et al. | 725/62 |
| 2009/0028220 A1 * | 1/2009 | Roh et al. | 375/136 |
| 2009/0028331 A1 * | 1/2009 | Millar et al. | 380/255 |
| 2009/0041159 A1 * | 2/2009 | Duvvuru et al. | 375/316 |
| 2009/0116374 A1 * | 5/2009 | Henriksson et al. | 370/203 |

* cited by examiner

*Primary Examiner*—Thong H Vu
(74) *Attorney, Agent, or Firm*—Rahman LLC (57) ABSTRACT

A method of layer combining based on generating a look-up table in an Integrated Services Digital Broadcasting (ISDB) receiver includes obtaining a transmission parameter configuration, generating the look-up table based on the transmission parameter configuration, assembling a null transport stream packets and a valid transport stream packets from a plurality of layers of a multiplexing frame, and generating a completed transport packet stream using the look-up table. The receiver may generate the look-up table by at least one of generating the look-up table in real time or selecting from a look-up table set based on the transmission parameter configuration. The transmission parameter configuration may include at least one of a transmission mode, a guard interval, a modulation, and a coding rate. The look-up table may define an order of the null transport stream packets and the valid transport stream packets from the plurality of layers in the multiplexing frame.

20 Claims, 7 Drawing Sheets

| LOOK-UP TABLE 302 | TRANSMISSION PARAMETER 304 |
|---|---|
| LOOK-UP TABLE 1 | MODE 3, GUARD ¼, QPSK MODULATION, CODE RATE ½ AND 1 SEGMENT |
| LOOK-UP TABLE 2 | MODE 3, GUARD ¼, QPSK MODULATION, CODE RATE 2/3 AND 1 SEGMENT |
| ⋮ | ⋮ |
| LOOK-UP TABLE 120 | MODE 2, GUARD 1/8, 64 QAM IN LAYER A, CODE RATE ½ IN THE LAYER A AND 64 QAM IN LAYER B, CODE RATE ½ IN THE LAYER B |

LOOK-UP TABLE BASED APPROACH FOR LAYER COMBINING IN ISDB-T AND ISDB-TSB RECEIVERS

BACKGROUND

1. Technical Field

The embodiments herein generally relate to wireless communication systems, and, more particularly, to multiplexing stream frame pattern configuration techniques.

2. Description of the Related Art

Orthogonal Frequency Division Multiplexing (OFDM) is a technique for modulating digital data, which uses a large number of closely-spaced orthogonal sub-carriers. In the OFDM technique, digital data is modulated to the amplitude and the phase of each of the orthogonal sub-carriers within a transmission band. This technique has been widely used in terrestrial digital broadcasting. In a digital broadcasting receiver design such as Integrated Services Digital Broadcasting-Terrestrial (ISDB-T) and Integrated Services Digital Broadcasting-Terrestrial Digital Sound Broadcasting (ISDB-TSB) for OFDM systems, transport multiplexing stream from the receiver side should comply with the ISDB-T and ISDB-TSB multiplexing stream frame pattern configuration.

An ISDB-T/ISDB-TSB multiplexing stream frame generally contains N transport stream packets in a multiplexing frame. A transport stream packet (TSP) in the ISDB-T/ISDB-TSB multiplexing frame is either a transport stream packet from layer A ($TSP_A$), or layer B ($TSP_B$), or layer C ($TSP_C$), or a null packet ($TSB_{null}$). The order of these TSPs is unique for a given transmission parameter configuration (e.g., transmission mode, guard interval, modulation and coding rate), and repeats every multiplexing frame. The ISDB-T and ISDB-TSB multiplexing stream frame pattern configuration can be reproduced by a model receiver at the receive side. In practice, it is generally challenging and complicated to exactly implement a receiver in hardware (e.g., in a chip) for multiplexing stream frame pattern configuration in accordance with the ISDB-T and ISB-TSB standards.

SUMMARY

In view of the foregoing, an embodiment herein provides a method of layer combining based on generating a look-up table in an Integrated Services Digital Broadcasting (ISDB) receiver, and a program storage device readable by computer, tangibly embodying a program of instructions executable by the computer to perform the method of layer combining based on generating a look-up table in an ISDB receiver. The method includes obtaining a transmission parameter configuration, generating the look-up table based on the transmission parameter configuration, assembling null transport stream packets and valid transport stream packets from layers of a multiplexing frame, and generating a completed transport packet stream using the look-up table. The receiver may generate the look-up table by generating the look-up table in real time or selecting from a look-up table set based on the transmission parameter configuration.

The transmission parameter configuration may include one or more of a transmission mode, a guard interval, a modulation, and a coding rate. The look-up table may include one or more of the transmission parameter configuration, and the look-up table is configurable and programmable by the receiver. The look-up table may define an order of the null transport stream packets and the valid transport stream packets from the layers in the multiplexing frame. The look-up table may be stored in the receiver. The multiplexing frame may include N number of transport stream packets (TSP), the N number of transport stream packets (TSP) may be from one or more of a layer A (TSPA), a layer B (TSPB), a layer C (TSPC), and a null (TSPnull) layer.

In another aspect, an ISDB receiver for layer combining based on a look-up table includes a memory unit including a computer program set of instructions, a display unit operatively connected to the memory unit, and a processor that executes the computer program set of instructions. The processor obtains a transmission parameter configuration, generates the look-up table based on the transmission parameter configuration, and assembles null transport stream packets and valid transport stream packets from a layers of a multiplexing frame based on the look-up table. The look-up table may be stored in the receiver.

The look-up table may define an order of the null transport stream packets and the valid transport stream packets from the layers in the multiplexing frame. The multiplexing frame may include N number of transport stream packets (TSP), the N number of transport stream packets (TSP) may be from one or more of a layer A (TSPA), a layer B (TSPB), a layer C (TSPC), and a null (TSPnull) layer. The look-up table may be configurable and programmable by the receiver. The transmission parameter configuration may include one or more of a transmission mode, a guard interval, a modulation, and a coding rate. The order of the null transport stream packets and the valid transport stream packets may be unique for the transmission parameter configuration.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIGS. 1 through 7, where similar reference characters denote corresponding features consistently throughout the figures, there are shown preferred embodiments.

Figure 1:
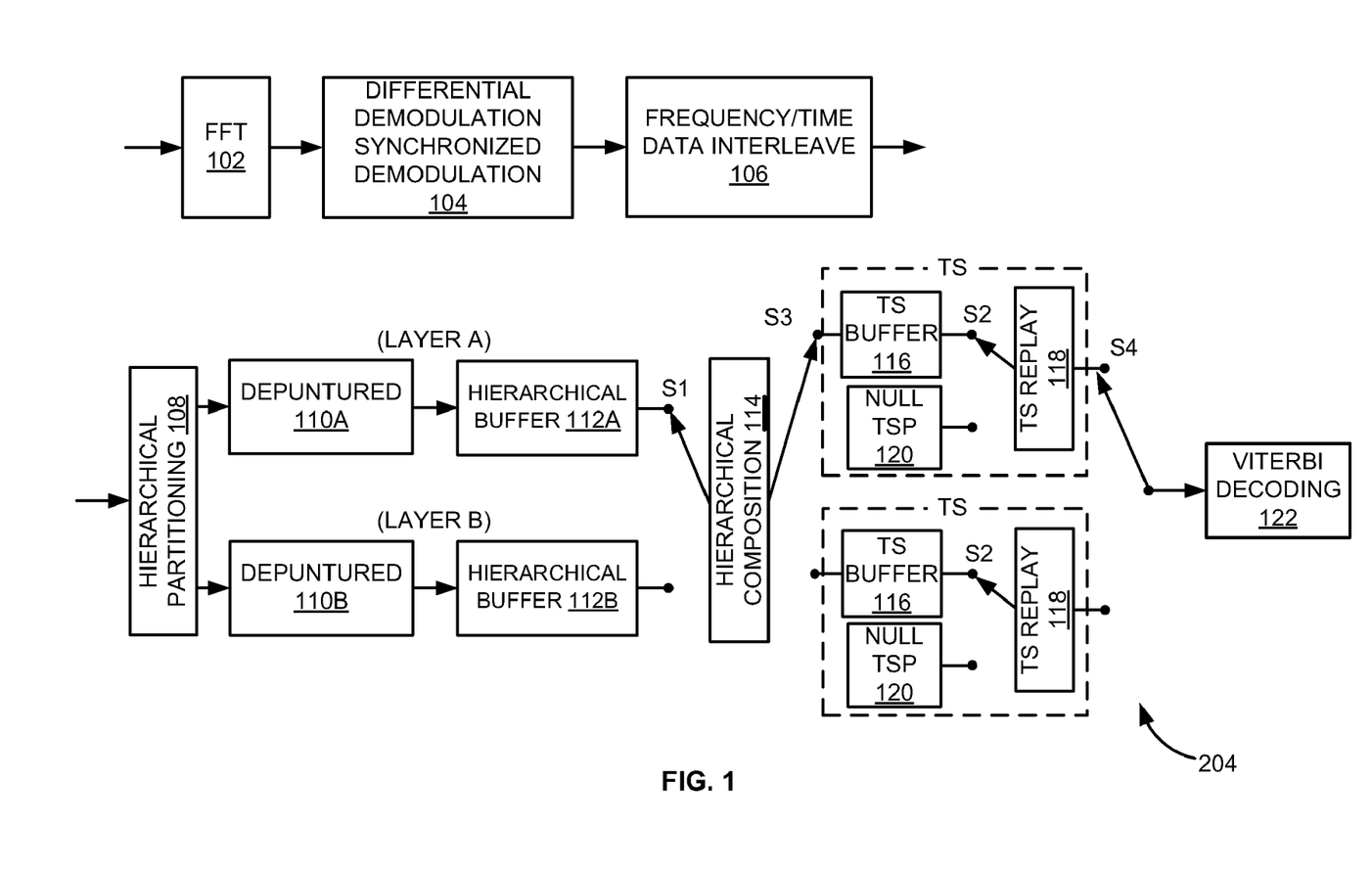
FIG. 1 is a block diagram of a receiver for multiplexing frame pattern configurations according to an embodiment herein.

FIG. 1 illustrates a receiver 204 for multiplexing a frame pattern configuration in accordance with the ISDB-TSB standard. The receiver 204 includes a Fast Fourier Transform (FFT) block 102, a differential demodulation synchronized demodulation block 104, a frequency/time data interleave block 106, a hierarchical partitioning block 108, depuncture blocks 110A-B, hierarchical buffer blocks 112A-B, a hierarchical composition block 114, a transport stream (TS) buffer block 116, a TS replay block 118, a Null TSP block 120, a Viterbi decoding block 122, and switches S1, S2, S3, and S4. The input data is received at the FFT block 102. Time is counted by a FFT sampling clock (not shown). The received data is demodulated in the differential demodulation synchronized demodulation block 104.

The signal after demodulation is then fed into the frequency/time data interleave block 106 and interleaved. The signal is then fed into the hierarchical partitioning block 108. The data is depunctured in the depuncture blocks 110A-B and stored in the hierarchical buffer blocks 112A-B. When the data is stored in the hierarchical buffer blocks 112A-B, switch S1 is active and the data is transferred to the TS buffer block 116 through the hierarchical composition block 114. The TS replay block 118 is adapted to look-up into the TS buffer block 116 to check whether more than one packet's data is stored. When more than one of the packet's data is stored, switch S2 is connected to the TS buffer block 116 and one of the packet's data are read out.

When no data is stored in the TS buffer block 116, switch S2 is connected to the Null TSP block 120 and a null packet is read out. Switch S3 is used to switch the TS replay block 118 to which the data are transferred from the hierarchical composition block 114. Following switch S3, switch S4 is used switch the TS replay block 118 that delivers the data into the Viterbi decoding block 122. The receiver 204 may be specified based on the fact that the multiplexing frame pattern configuration is the same for every frame for a given transmission parameter configuration (which includes transmission mode, guard interval, modulation and coding rate).

Figure 2:
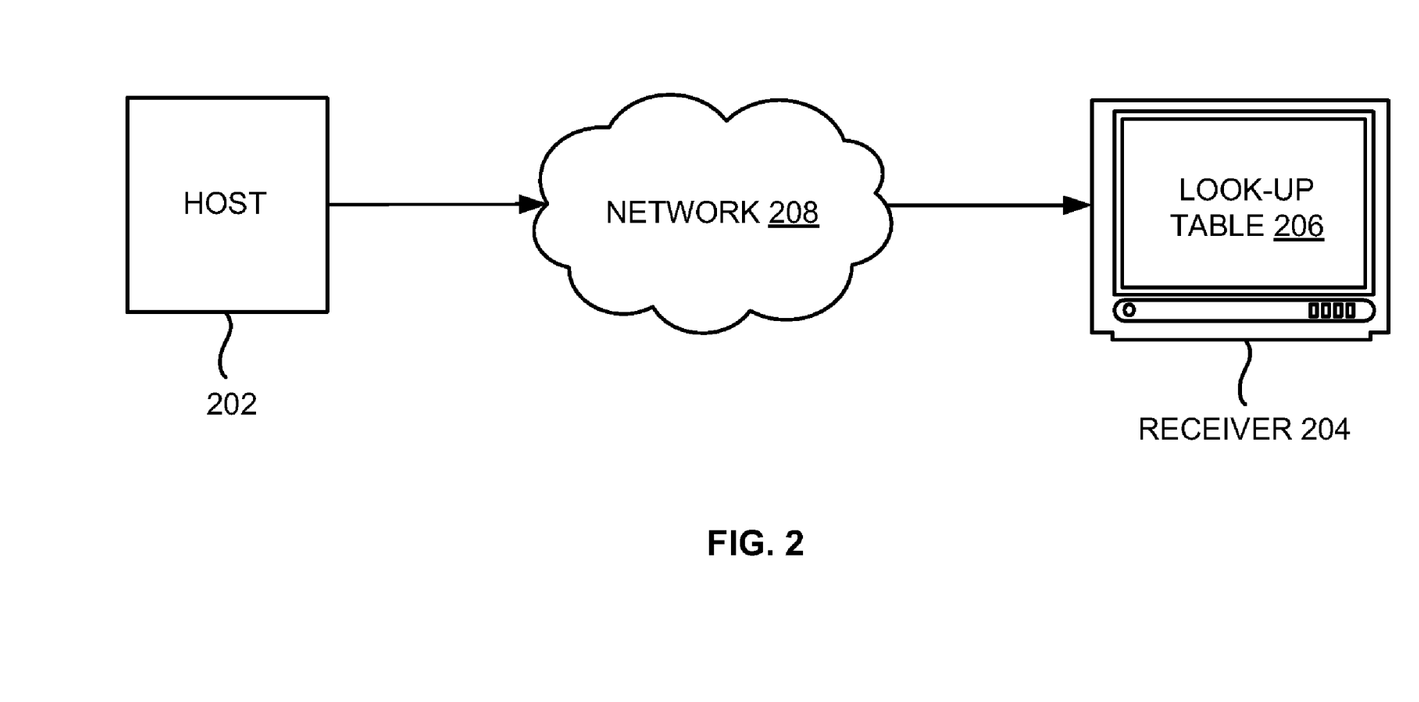
FIG. 2 is a schematic diagram of a system according to an embodiment herein.

FIG. 2 is a system view of a host 202 communicating to the receiver 204 (of FIG. 1) having a look-up table 206 through a network 208 according to an embodiment herein. The host 202 contains data accessible by any device in the network 208. The receiver 204 receives electrical signals (e.g., waves) from the host 202 connected in the network 208. The receiver 204 outputs a transport multiplexing stream complying with an ISDB-T and ISDB-TSB multiplexing stream frame pattern configuration. In a preferred embodiment, the look-up table 206 is stored in the receiver 204. The look-up table 206 defines an order of null transport stream packets and valid transport stream packets from different layers for a multiplexing frame (the look-up table 206 defines the multiplexing frame pattern configuration).

The look-up table 206 is configurable and can be programmed by the host 202 or the receiver 204. The look-up table 206 can be provided by the host 202 to the receiver 204 once the receiver 204 acquires a transmission parameter configuration or detects any changes in the transmission parameter configuration. The transmission parameter configuration may include a transmission mode, a guard interval, a modulation, and a coding rate. The receiver 204 uses the look-up table 206 to assemble the valid transport stream from different layers and the null transport stream packets in order to form the packet stream complying with the ISDB-T and ISDB-TSB standards.

Figure 3:
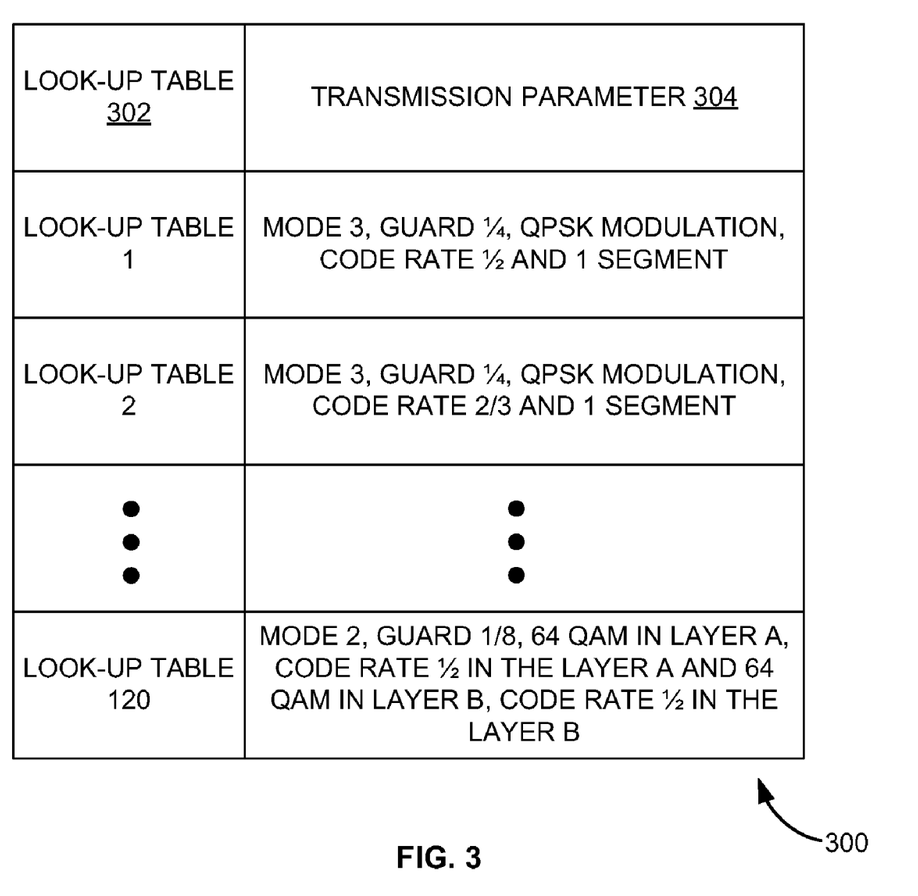
FIG. 3 is a schematic diagram of a look-up table set according to an embodiment herein.

FIG. 3 illustrates a look-up table set 300 according to an embodiment herein. The look-up table set 300 includes a look-up table 302 field, and a transmission parameter 304 field. The look-up table 302 field includes a look-up tables 1 to 120. The transmission parameter 304 field includes transmission parameters (e.g., a mode, a guard, a modulation, a coding rate, and a segment for the look-up table 1 to 120). For the look-up table 1, the transmission parameters are mode 3, guard ¼, QPSK modulation, code rate ½, and 1 segment.

For the look-up table 2, the transmission parameters are mode 3, guard ¼, QPSK modulation, code rate ⅔, and 1 segment. For the look-up table 120, the transmission parameters are mode 2, guard ⅛, 64 QAM in layer A, code rate ½ in the layer A and 64 QAM in layer B, and code rate ½ in the layer B. For the receiver 204 (of FIGS. 1 and 2), if the transmission parameters are mode 3, guard ¼, QPSK modulation, code rate ⅔ and 1 segment reception, the host 202 (of FIG. 2) sends the look-up table 2 to the receiver 204 and the receiver 204 stores the look-up table 2 in the receiver 204 and uses the look-up table 2 to assemble the null transport stream packets and the valid transport stream packets.

Figure 4:
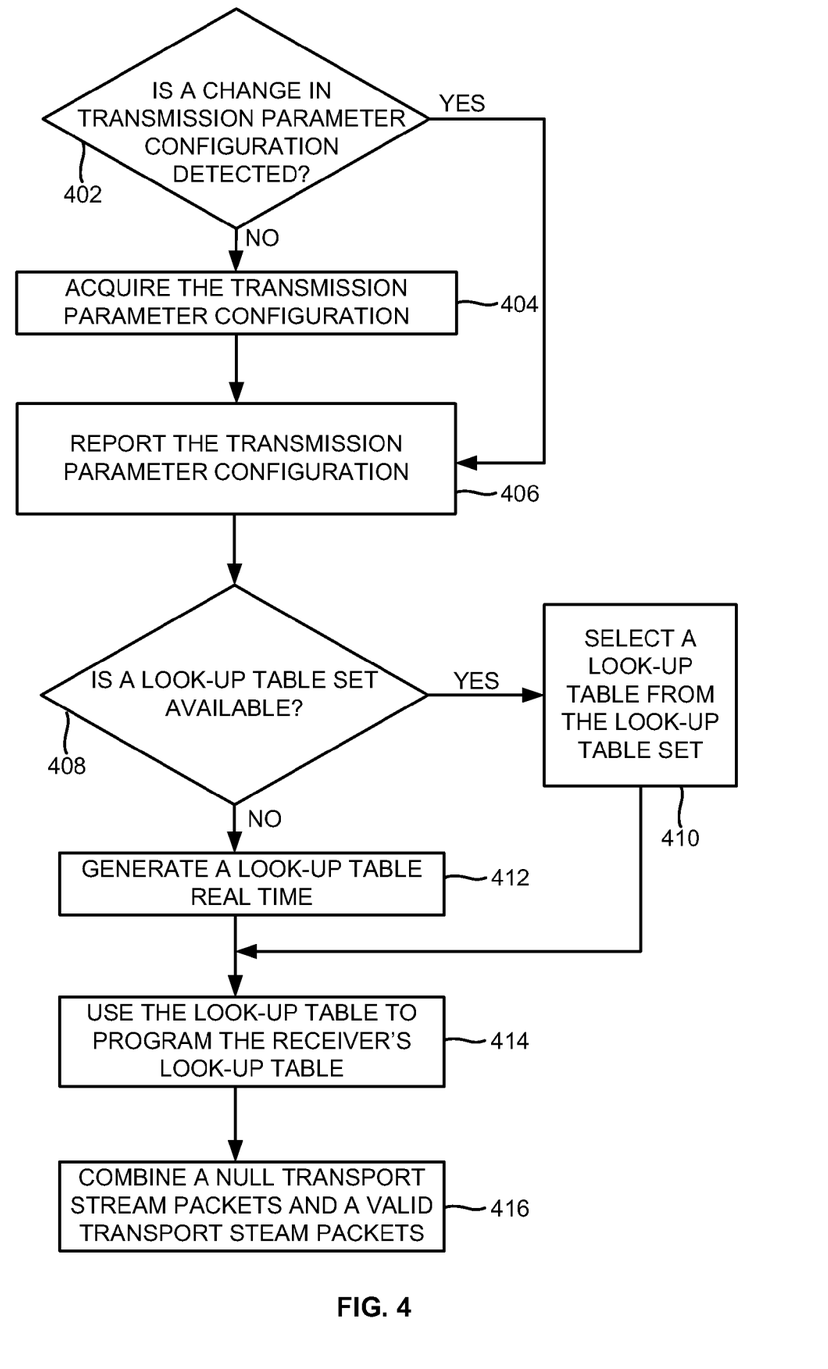
FIG. 4 is a flow diagram illustrating a process of generating a look-up table for a receiver by a host according to an embodiment herein.

FIG. 4, with reference to FIGS. 1 through 3, is a flow diagram illustrating a process of generating the look-up table 206 for the receiver 204 by the host 202 according to an embodiment herein. The receiver 204 needs a look-up table. The look-up table 206 is based on the transmission parameters (e.g., the mode, the guard, the modulation, the coding rate etc.). The look-up table 206 is only dependent on same transmission parameters. In one embodiment, for different transmission parameters, the look-up table 206 is different (e.g., look-up tables 1 to 120 in FIG. 3). For the same transmission parameter, the look-up table 206 is the same.

In step 402, a condition is checked if a change of transmission parameter configuration (e.g., a change in the transmission mode, the guard interval, the modulation, and/or the coding rate) is detected by the receiver 204. If there is no change in the transmission parameter configuration (No), the transmission parameter configuration is acquired (by the receiver 204) in step 404, else (Yes) the transmission parameter configuration is immediately reported (by the receiver 204 to the host 202) in step 406. Furthermore, upon acquisition of the transmission parameter configuration in step 404, the configuration is reported in step 406.

In step 408, a condition is checked if a look-up table set 300 is available. If a look-up table set 300 is not available (No), a look-up table real time is generated (by the host 202) in step 412, else (Yes) a look-up table (look-up table 1 to 120) is selected from a look-up table set 300 located in the host 202 (by the host 202) in step 410. For the host 202, it can store all the possible look-up tables (look-up tables 1 to 120) or it has a real-time software which can generate a look-up table. For the chip, to reduce the cost, it only stores a look-up table 206. Once the receiver 204 acquires the transmission parameter or detects a transmission parameter change, the receiver 204 asks the host 202 to send a proper look-up table 206 to the receiver 204 according to the transmission parameters.

In step 414, the look-up table is used (by the host 202) to program the receiver's look-up table 206. In order to let the receiver 204 support all the transmission parameters in the ISDBT and ISDB-TSB standards, the look-up table 206 in the receiver 204 is programmable according to the transmission parameter. In step 416, the null transport stream packets and the valid transport stream packets from different layers are assembled (by the receiver 204) based on the look-up table 206 generated or selected.

Figure 5:
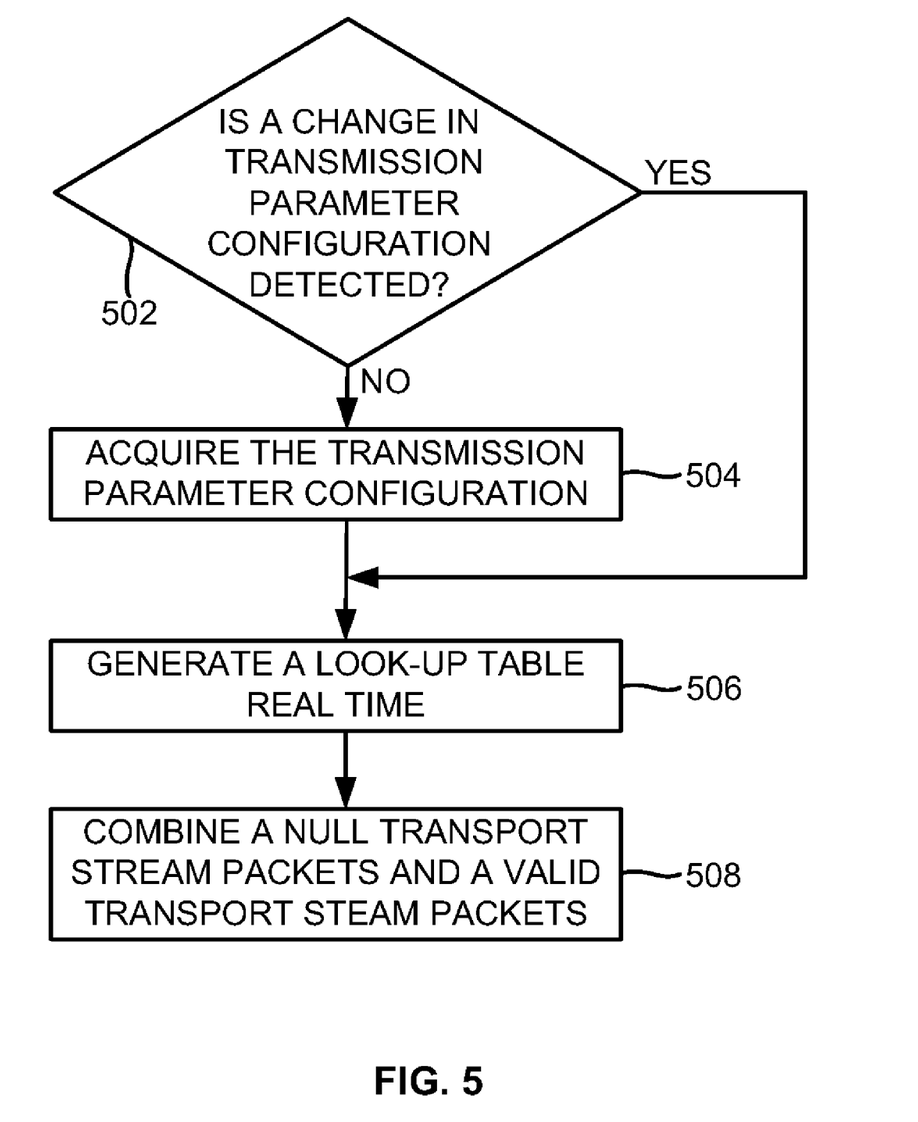
FIG. 5 is a flow diagram illustrating a process of generating a look-up table for a receiver by a receiver according to an embodiment herein.

FIG. 5, with reference to FIGS. 1 through 4, is a flow diagram illustrating a process of generating the look-up table 206 for the receiver 204 by the receiver 204 according to an embodiment herein. In step 502, a condition is checked if a change in transmission parameter configuration (e.g., a transmission mode, a guard interval, a modulation, and a coding rate) is detected by the receiver 204. If there is no change in the transmission parameter configuration (No), the transmission parameter configuration is acquired (by the receiver 204) in step 504, else (Yes) a look-up table real time is generated according to the acquired transmission parameter configuration or the change in the transmission parameter configuration (by the receiver 204) in step 506.

In one embodiment, the real time look-up table is embodied as software having the same operations depicted in FIG. 1. It is based on the transmission parameters (e.g., the mode, the guard, the modulation, the coding rate, etc.). In step 508, the null transport stream packets and the valid transport stream packets from different layers are assembled (by the receiver 204) based on the look-up table 206 generated.

Figure 6:
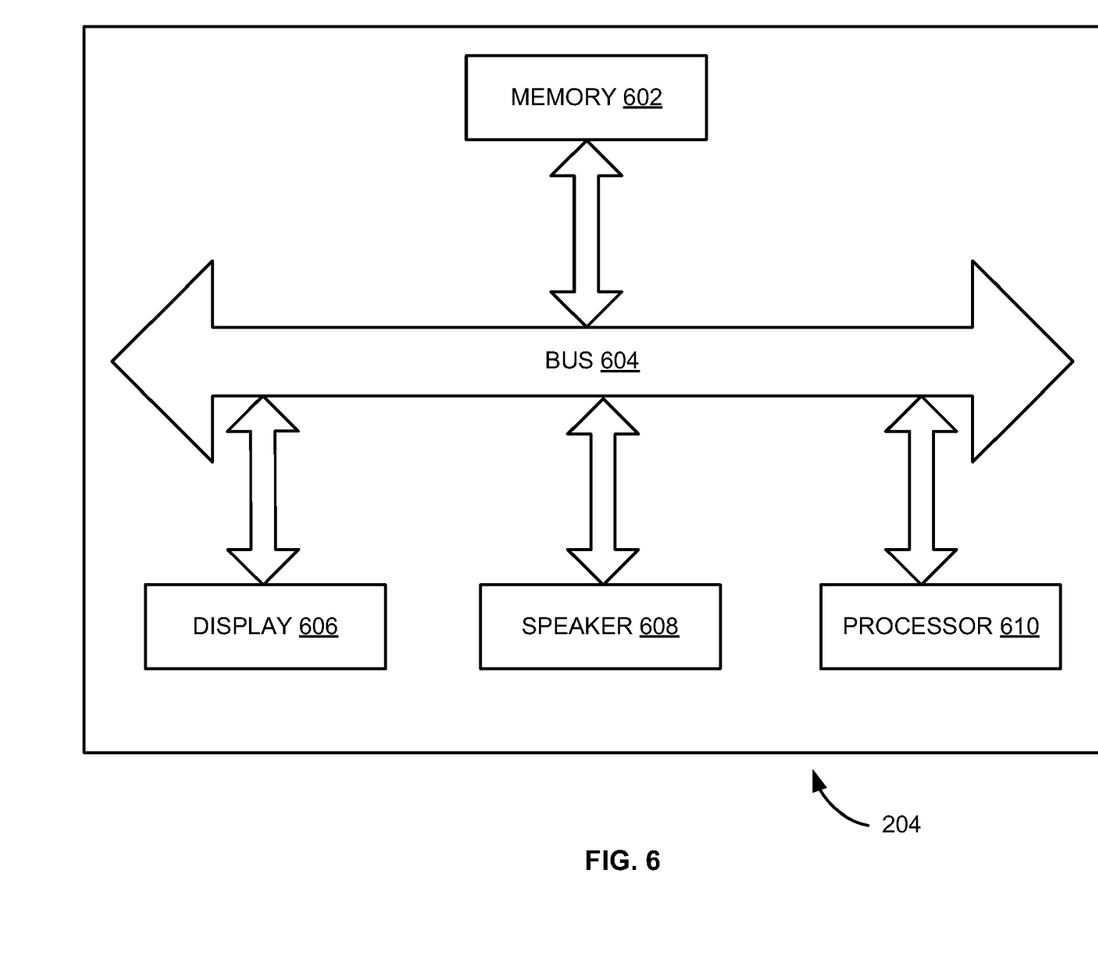
FIG. 6 is a schematic diagram of a mobile TV receiver according to an embodiment herein.

FIG. 6 illustrates an exploded view of a mobile TV receiver 204 having a memory 602 with a computer set of instructions, a bus 604, a display 606, a speaker 608, and a processor 610 capable of processing the set of instructions to perform any one or more of the methodologies herein, according to an embodiment herein.

The processor 610 may also enable frequency samples to be consumed in the form of one or more displays 606 or audio for output via speaker and/or earphones 608. The processor 610 may also carry out the methods described herein and in accordance with the embodiments herein. The received frequency domain sample may also be stored in the memory 602 for future processing or consumption. The memory 602 may also store specific information about the frequency domain sample available in the future or stored from the past. When the sample is selected, the processor 610 may pass information. The information may be passed among functions within mobile TV receiver 204 using the bus 604.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
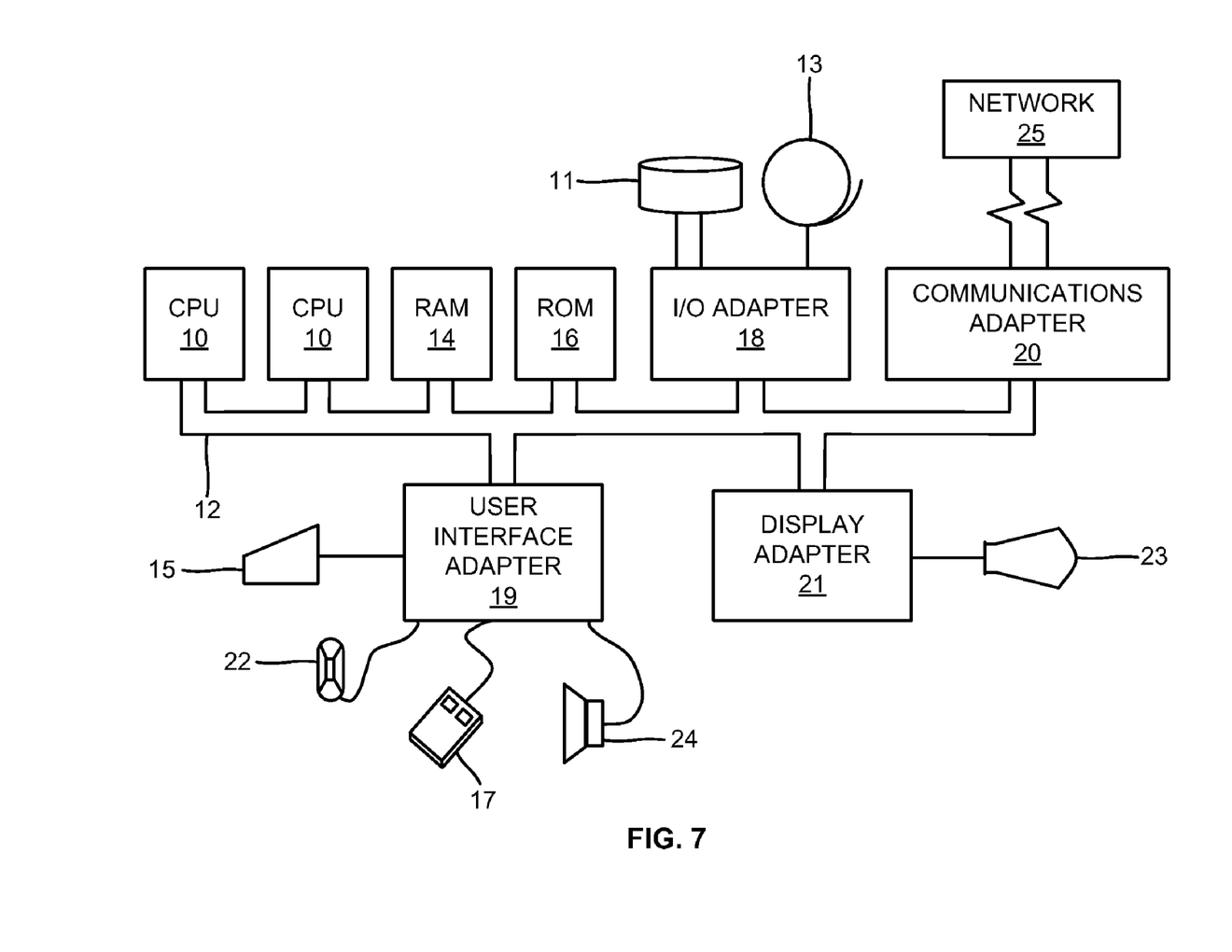
FIG. 7 is a schematic diagram of a computer architecture according to an embodiment herein.

A representative hardware environment for practicing the embodiments herein is depicted in FIG. 7. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system.

The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The look-up table based approach overcomes the problem of implementing a receiver in hardware design. In the receiver 204, only a look-up table 206 which specifies the multiplexing stream pattern configuration is needed and the receiver 204 does not have to be implemented in the chip. The look-up table 206 is configurable and can be programmed by the host 202 or the receiver 204 itself. Moreover, the look-up table 206 can be provided by the host 202 to the receiver 204 once the receiver 204 acquires the transmission parameter configuration or detects any changes in the transmission parameter configuration.

The look-up table based approach is used for combining valid transport stream packets from different layers and null transport stream packets such that the final transport stream complies with the ISDB-T and ISDB-TSB multiplexing frame pattern configuration. The look-up table 206 is stored in the receiver 204 and defines the order of the null transport stream packets and the valid transport stream packets from different layers for a multiplexing frame; i.e., the multiplexing frame pattern configuration. The receiver 204 uses this look-up table 206 to assemble the valid transport stream from different layers and null transport stream packets in order to form the packet stream complying with ISDB-T and ISDB-TSB standards.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of layer combining based on generating a look-up table in a receiver, said method comprising:
    obtaining a transmission parameter configuration;
    generating said look-up table based on said transmission parameter configuration;
    assembling null transport stream packets and valid transport stream packets from a plurality of layers of a multiplexing frame; and
    generating a completed transport packet stream using said look-up table,
    wherein said look-up table defines an order of said null transport stream packets and said valid transport stream packets from said plurality of layers in said multiplexing frame, and
    wherein said multiplexing frame comprises N number of transport stream packets (TSP), wherein said N number of transport stream packets (TSP) is from at least one of a layer A ($TSP_A$), a layer ($TSP_B$), a layer C ($TSP_C$), and a null ($TSP_{null}$) layer.

2. The method of claim 1, wherein said receiver generates said look-up table by at least one of generating said look-up table in real time and selecting from a look-up table set based on said transmission parameter configuration.

3. The method of claim 1, wherein said transmission parameter configuration comprises at least one of a transmission mode, a guard interval, a modulation, and a coding rate.

4. The method of claim 1, wherein said look-up table comprises at least one of said transmission parameter configuration, and wherein said look-up table is configurable and programmable by said receiver.

5. The method of claim 1, wherein said receiver comprises a mobile television receiver.

6. The method of claim 1, wherein said look-up table is stored in said receiver.

7. The method of claim 5, wherein said mobile television receiver comprises an Integrated Services Digital Broadcasting (ISDB) receiver.

8. A receiver for layer combining based on a look-up table, said receiver comprising:
    a memory unit comprising a computer program set of instructions;
    a display unit operatively connected to said memory unit; and
    a processor that executes said computer program set of instructions, wherein said processor obtains a transmission parameter configuration, generates said look-up table based on said transmission parameter configuration, and assembles a null transport stream packets and a valid transport stream packets from a plurality of layers of a multiplexing frame based on said look-up table,
    wherein said look-up table defines an order of said null transport stream packets and said valid transport stream packets from said plurality of layers in said multiplexing frame, and
    wherein said multiplexing frame comprises N number of transport stream packets (TSP), wherein said N number of transport stream packets (TSP) is from at least one of a layer A ($TSP_A$), a layer ($TSP_B$), a layer C ($TSP_C$), and a null ($TSP_{null}$) layer.

9. The receiver of claim 8, wherein said look-up table is stored in said receiver.

10. The receiver of claim 8, wherein said receiver comprises a mobile television receiver.

11. The receiver of claim 10, wherein said mobile television receiver comprises an Integrated Services Digital Broadcasting (ISDB) receiver.

12. The receiver of claim 8, wherein said look-up table is configurable and programmable by said receiver.

13. The receiver of claim 8, wherein said transmission parameter configuration comprises at least one of a transmission mode, a guard interval, a modulation, and a coding rate.

14. The receiver of claim 8, wherein said order of said null transport stream packets and said valid transport stream packets are unique for said transmission parameter configuration.

15. A non-transitory program storage device readable by computer, tangibly embodying a program of instructions executable by said computer to perform a method of layer combining based on generating a look-up table in a receiver, said method comprising:

obtaining a transmission parameter configuration;

generating said look-up table based on said transmission parameter configuration;

assembling a null transport stream packets and a valid transport stream packets from a plurality of layers of a multiplexing frame; and     generating a completed transport packet stream using said look-up table,     wherein said look-up table defines an order of said null transport stream packets and said valid transport stream packets from said plurality of layers in said multiplexing frame, and     wherein said multiplexing frame comprises N number of transport stream packets (TSP), wherein said N number of transport stream packets (TSP) is from at least one of a layer A ($TSP_A$), a layer B ($TSP_B$), a layer C ($TSP_C$), and a null ($TSP_{null}$) layer.

16. The program storage device of claim 15, wherein said method further comprises generating, by said receiver, said look-up table by at least one of generating said look-up table in real time and selecting from a look-up table set based on said transmission parameter configuration.

17. The program storage device of claim 15, wherein said transmission parameter configuration comprises at least one of a transmission mode, a guard interval, a modulation, and a coding rate.

18. The program storage device of claim 15, wherein said look-up table comprises at least one of said transmission parameter configuration, and wherein said look-up table is configurable and programmable by said receiver.

19. The program storage device of claim 15, wherein said receiver comprises a mobile television receiver.

20. The program storage device of claim 15, wherein said look-up table is stored in said receiver.

\* \* \* \* \*